United States Patent
Pillar et al.

(10) Patent No.: US 6,438,106 B1
(45) Date of Patent: Aug. 20, 2002

(54) INTER-CLASS SCHEDULERS UTILIZING STATISTICAL PRIORITY GUARANTEED QUEUING AND GENERIC CELL-RATE ALGORITHM PRIORITY GUARANTEED QUEUING

(75) Inventors: John Pillar, Nepean; Bernard Marchand, Cantley; Bernard St-Denis, Nepean, all of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/218,510

(22) Filed: Dec. 22, 1998

(51) Int. Cl.$^7$ ................................. H04L 12/26
(52) U.S. Cl. ................. 370/232; 370/233; 370/234; 370/395.42
(58) Field of Search ................. 370/229, 230, 370/231, 232, 233, 234, 395.1, 395.42

(56) References Cited

U.S. PATENT DOCUMENTS

| | | | |
|---|---|---|---|
| 5,553,061 A | * 9/1996 | Waggener, Jr. et al. | 370/232 |
| 5,570,360 A | 10/1996 | Klausmeier et al. | |
| 5,768,259 A | 6/1998 | Stock et al. | |
| 5,794,025 A | 8/1998 | Bergantino et al. | |
| 5,805,569 A | * 9/1998 | Lindqvist et al. | 370/229 |
| 5,818,815 A | 10/1998 | Carpentier et al. | |
| 5,937,205 A | * 8/1999 | Mattson et al. | 395/826 |
| 6,018,519 A | * 1/2000 | Ginzboorg | 370/236 |
| 6,091,709 A | * 7/2000 | Harrison et al. | 370/235 |
| 6,115,373 A | * 9/2000 | Lea | 370/355 |

FOREIGN PATENT DOCUMENTS

EP  0 817 434 A2  1/1998

OTHER PUBLICATIONS

Asynchronous Transfer Mode, Solution For Broadband ISDN, second edition, Martin De Prycker, Ellis Horwood, NY 1993.

ATM User–Network Interface Specification, Version 3.1.

Law K L E: "The Bandwidth Guaranteed Prioritized Queuing and its Implementations", Global Telecommunications Conference (Globecom), US, New York, IEEE, 1997, pp. 1445–1449, XP000737765 ISBN: 0–7803–4199–6.

* cited by examiner

*Primary Examiner*—Ajit Patel
*Assistant Examiner*—Tim Spafford
(74) *Attorney, Agent, or Firm*—Gibbons, Del Deo, Dolan, Griffinger & Vecchione

(57) ABSTRACT

Inter-class schedulers for digital link systems provide high efficiency utilization of limited bandwidth by employing queuing techniques referred to as Statistical Priority Guarantee Queuing (SPGQ) and Generic Cell-Rate Algorithm Priority Guarantee Queuing (GCRA-PGQ). SPGQ "elevates" the priority of otherwise low-priority classes under prescribed circumstances in accordance with a statistical process. The SPGQ scheduler determines whether a number within a range produced by a uniform random number generator lies within a sub-range proportional to the programmed statistical guarantee for a given class. If the number lies within the sub-range associated with a given class, then the priority of that class is elevated to a higher priority when both are eligible to transmit. The GCRA-PGQ scheduler operates as a strict priority mechanism until a class requires bandwidth in excess of a GCRA "window" or threshold for that class. When that occurs, the service priority of that class is temporarily lowered.

3 Claims, 5 Drawing Sheets

RANDOM NUMBER GENERATOR 10
RANDOM NUMBER GENERATOR
OUTPUT MONITOR 12
QUEUE MODULE 14
Figure 3

Figure 4

Step 1100:
ESTABLISH PRIORITY GUARANTEE QUEUE:
WHEREIN AT LEAST ONE CLASS OF SERVICE
HAS UNIQUE SERVICE PRIORITY

Step 1200:
ASSIGN TO THAT CLASS
A GENERIC CELL RATE ALGORITHM THRESHOLD
BASED UPON SELECTED PARAMETERS OF
DIGITAL TRAFFIC FOR THAT CLASS

Step 1300:
MONITOR SELECTED PARAMETERS OF THE
DIGITAL TRAFFIC FOR THAT CLASS

Step 1400:
HAVE SELECTED PARAMETERS OF THE DIGITAL
TRAFFIC IN THE CLASS EXCEEDED
GCRA THRESHOLD FOR THAT CLASS?

Step 1500:
IF YES: LOWER PRIORITY
OF SERVICE ASSIGNED TO THAT CLASS

INTER-CLASS SCHEDULERS UTILIZING STATISTICAL PRIORITY GUARANTEED QUEUING AND GENERIC CELL-RATE ALGORITHM PRIORITY GUARANTEED QUEUING

BACKGROUND OF THE INVENTION

This invention relates generally to inter-class schedulers for digital link systems, including asynchronous transfer mode (ATM) telecommunications systems, and, more particularly, provides novel inter-class schedulers employing statistical priority guaranteed queuing (SPGQ) and generic cell-rate algorithm priority guaranteed queuing (GCRA-PGQ).

The systems and methods disclosed herein are discussed with particular application to ATM systems. However, those skilled in the art will appreciate that the inventive subject matter disclosed herein is equally applicable to other settings in which a plurality of devices transmit and/or receive digital signals over a bandwidth-limited link, such as systems where multiple client or end-user machines communicate with a host.

Information regarding ATM systems can be found in the ATM Forum, "ATM User-Network Interface Specification," Version 3.1, September, 1994, and in Martin de Prycker, "Asynchronous Transfer Mode: Solution for Broadband ISDN, " Ellis Horwood, N.Y. 1993, both of which are incorporated by reference herein. Aspects of ATM systems are also discussed in U.S. Pat. Nos. 5,818,815; 5,794,025; and 5,768,259, also incorporated by reference herein.

An advantage of high bandwidth, fixed length cell based transfer mode techniques such as ATM, is the capability of high-speed, low-delay multiplexing and switching of different types of user information traffic—including data, voice, image and video—over the same network, while optimizing bandwidth and resources utilization.

In ATM connection-oriented networks, the end-to-end traffic of data for one user, between the source and the destination, is represented by a Virtual Connection (VC); several Virtual Connections can be grouped in a Virtual Path (VP) that can be switched as a unit.

An ATM system segments user traffic into fixed-length 53-byte cells. A 5-byte header in each cell typically includes a virtual channel identifier (VCI) and a virtual path identifier (VPI) associated with the corresponding cell. The VCI and VPI fields together identify the virtual connection that is established when a user requests a network connection in an ATM system. The allocation of available transmission opportunities or slots to user traffic cells is generally referred to as cell scheduling, and the devices that accomplish this task are schedulers.

As employed in ATM and other digital link systems, an inter-class scheduler is a device that monitors the status of an input queue for each class of service (voice, video, and other digital signals), updates the eligibility data of service of the class, and according to some predefined criteria, makes decisions about the class to be serviced at the next transmit opportunity. The digital switching apparatus utilizes this decision outcome to select a particular class for the next transmit opportunity.

In essence, the inter-class scheduler enables the digital link system to determine which class will next receive a share of limited bandwidth and processor resources. These decisions are vital to the performance of bandwidth-limited digital link systems.

A major problem to be resolved in cell-based networks is congestion control. Since the cells are short, no space is allocated in the header to enable error recovery for the cell payload. If one cell of the block has been lost or discarded by the network in case of network congestion, error recovery is performed at the higher-level by recovery protocols retransmitting the user data block. Since the error rate is normally quite low in the internode links, the loss of cells due to random error is not generally a problem. However, when a node discards cells based upon detection of traffic congestion, it is unlikely that these cells will come from a small number of logical data blocks. Consider, for example, a worst case scenario, in which 1000 messages come from 1000 different connections. Under such a circumstance, the discarding of 1000 cells, where the average user data block length is 2K Bytes (a low estimate) sent as 43 cells, can cause the network to absorb a retransmission of 43,000 cells.

Depending on the type of traffic conveyed over the network, congestion can damage the quality of traffic beyond acceptable limits. For voice applications it is more acceptable to lose data than to excessively delay it. For file applications it is more acceptable to delay the data than to lose any portion of it. That is why the ATM networks provide different Quality of Service (QoS) guarantees for different classes of service. In order to meet the QoS, the network nodes have to control the traffic congestion both at connection admission time and once the connection is established.

A first control on traffic congestion, once the connection is established, is performed by a policing function implemented in a device, referred to as the "policer," of the network access node adapter. The policer will detect and penalize violations of the peak cell rate of "current" traffic compared to the peak cell rate required at call set-up.

A second control of traffic congestion consists in shaping the output network node traffic by spacing cell departures such that the time between two departures of cells for a same connection is never below the minimal value negotiated at connection setup time. The multiplexing of spaced cells tends to decrease the "burstiness" of the aggregate traffic, permitting a better utilization of the network resources.

The policing function is typically implemented in the network nodes by a "policer"that forms part of the high speed adapter cards in the devices accessing the network. The shaping function is implemented in the network nodes by a "shaper" that controls the sending of the output traffic cells and is also part of the high ed adapter cards.

The policing function proposed as a standard by the ITU (International Telecommunications Union), is the Generic Cell Rate Algorithm (GCRA). Details of the GCRA are given in the ATM Forum, "ATM User-Network Interface Specification", Version 3.0, 1994, incorporated by reference herein. Those skilled in the art will appreciate that commercially-available, application-specific integrated circuits (ASICs) have been developed to implement GCRA.

The role of the GCRA is, for each connection, to monitor the traffic arriving upstream according to the cell period T (T corresponds to the inverse of the peak cell rate R) and a given tolerance tau on this period. Basically, a cell is assumed to be conforming if the time elapsed between the arrival of two consecutive cells (belonging to the same connection) is greater than or equal to T—tau . If not, the cell is assumed to be nonconforming and is tagged and possibly discarded.

The policer discards cells not only because the source of traffic has violated the parameters negotiated at connection establishment, but also because of a distortion in the cell stream commonly referred to as "jitter" or Cell Delay Variation (CDV). This distortion is due to the queuing of the cells at each intermediate network node and more generally the multiplexing of the cells on the output lines. The magnitude of the "jitter" depends on many parameters, including the connection peak rate; the peak rate of the other connections that share the same link; the link load; and the number of nodes passed through.

The foregoing discussion demonstrates that considerable design and implementation effort has been expended in attempting to control congestion problems in digital link systems. In this regard, it is also clear that inter-class schedulers must be sufficiently efficient to limit adverse effects of congestion. Thus, an effective inter-class scheduler should have several properties. First, it should provide a minimum bandwidth guarantee for each class. Second, it should provide exclusive allocation of unused bandwidth to the highest priority class that requires it. In addition, it should enable provisioning of work-conserving service.

Inter-class schedulers can be categorized into absolute or "static" priority schedulers on the one hand, and dynamic priority schedulers on the other. The category of dynamic priority schedulers can be divided into those which provide a fixed minimum bandwidth guarantee, and those which provide a programmable minimum bandwidth guarantee.

One deficiency of absolute priority schedulers is that they cannot guarantee either bandwidth or cell delay for any traffic classes other than the one with the highest priority. In particular, minimum bandwidth to the lower classes can not be guaranteed because it will not be serviced until all packets or cells belonging to classes with higher priorities are services. If the system assigns a high priority to an application which seeks to use the entire bandwidth, lower-priority classes may be completely locked out and be denied any service opportunity.

In an attempt to eliminate this problem, schedulers using a Priority Guaranteed Queuing (PGQ) paradigm have been implemented. The PGQ paradigm is a absolute priority scheduler combined with a guaranteed servicing concept. PGQ schedules cells belonging to different priority classes within a virtual link. PGQ attempts to achieve bandwidth guarantees for all classes by offering each of the classes at least a guaranteed portion of the total bandwidth available to the set of classes to which the PGQ algorithm been applied.

An ideal PGQ scheduler (such as GCRA-PGQ) is highly accurate because it maintains a history of previous transmissions and supports variable size packets. Implementation of this algorithm, however, is relatively complex and costly in terms system resources, and since scheduler accuracy may not be an overriding system objective, the additional cost in resources may not be worth the modest accuracy advantage.

With the rapid expansion of Internet and other digital link systems, more and more digital classes of service are being defined and demanded by customer/clients—including voice, video, and internet-related digital data. As this occurs, more and more resources will be required to provide inter-class scheduling to meet the quality of service (QoS) requirement of each class. For example, a typical digital packet-switching system may handle as many as 8 classes, rendering a full PGQ scheduler relatively complex and costly. Implementation of an inexpensive, efficient mechanism for priority guaranteed queue scheduling would provide a competitive advantage.

Accordingly, there exists a need for improved inter-class scheduling systems and methods for digital link systems.

It is accordingly an object of the invention to provide low-cost, simple and efficient mechanism to provide priority guaranteed queuing.

It is another object of the invention to provide such methods and apparatus that avoid the burden of implementing a full priority guaranteed queuing scheduler typical of the prior art.

It is a further object of the invention to provide such methods and apparatus that minimize cell delay variation for high priority classes.

Other general and specific objects of the invention will in part be obvious and will in part appear hereinafter.

SUMMARY OF THE INVENTION

The foregoing objects are attained by the invention, one aspect of which provides an inter-class scheduler utilizing Statistical Priority Guarantee Queuing (SPGQ), a method of modifying the pure-priority behavior of an absolute priority scheduler, by "elevating" the priority of otherwise low-priority classes in accordance with a statistical process. In accordance with this aspect of the invention, the scheduler determines whether a number within a range produced by a uniform random number generator lies within a sub-range proportional to the programmed statistical guarantee for a given class. If the number lies within the sub-range associated with a given class, then the priority of that class is elevated to a higher priority when both are eligible to transmit.

Another aspect of the invention provides an inter-class scheduler utilizing Generic Cell-Rate Algorithm Priority Guarantee Queuing (GCRA-PGQ). In accordance with this aspect of the invention, GCRA-PGQ operates as a strict priority mechanism until a class exceeds a GCRA "traffic shape" or threshold representative of guaranteed bandwidth, whereupon the system will lower the priority of service accorded that class.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which:

FIG. 3 is a block diagram depicting the major components of an application-specific integrated circuit (ASIC) embodying the SPGQ scheduler of FIG. 1.

FIG. 4 is a flow chart depicting the general method steps executed by a Generic Cell-Rate Algorithm Priority Guarantee Queuing (GCRA-PGQ) scheduler constructed in accordance with the invention.

DESCRIPTION OF ILLUSTRATED EMBODIMENTS

SPGQ

One practice of the invention, referred to herein as Statistical Priority Guarantee Queuing (SPGQ), is an absolute priority scheduler with fixed or programmable minimum bandwidth guarantees for each class of the set to which PGQ has been applied. The use of minimum bandwidth guarantees eliminates a problem typical of prior art schedulers, in which an excess of higher priority traffic can entirely "starve out" lower priority classes, preventing the lower priority traffic from obtaining access to the link.

In accordance with the present invention, SPGQ is a method of modifying the pure-priority behavior of an absolute priority scheduler (in which lower-priority classes have access to a certain defined bandwidth, and preferably a programmable defined bandwidth) by temporarily "elevating" the priority of otherwise low-priority service classes in accordance with a statistical process.

The SPGQ of the present invention is based on determining whether a number within a range produced by a uniform random number generator lies within a sub-range proportional to the programmed statistical guarantee. If the number lies within the sub-range, then that class priority is elevated to a higher priority when both are eligible to transmit.

Figure 1:
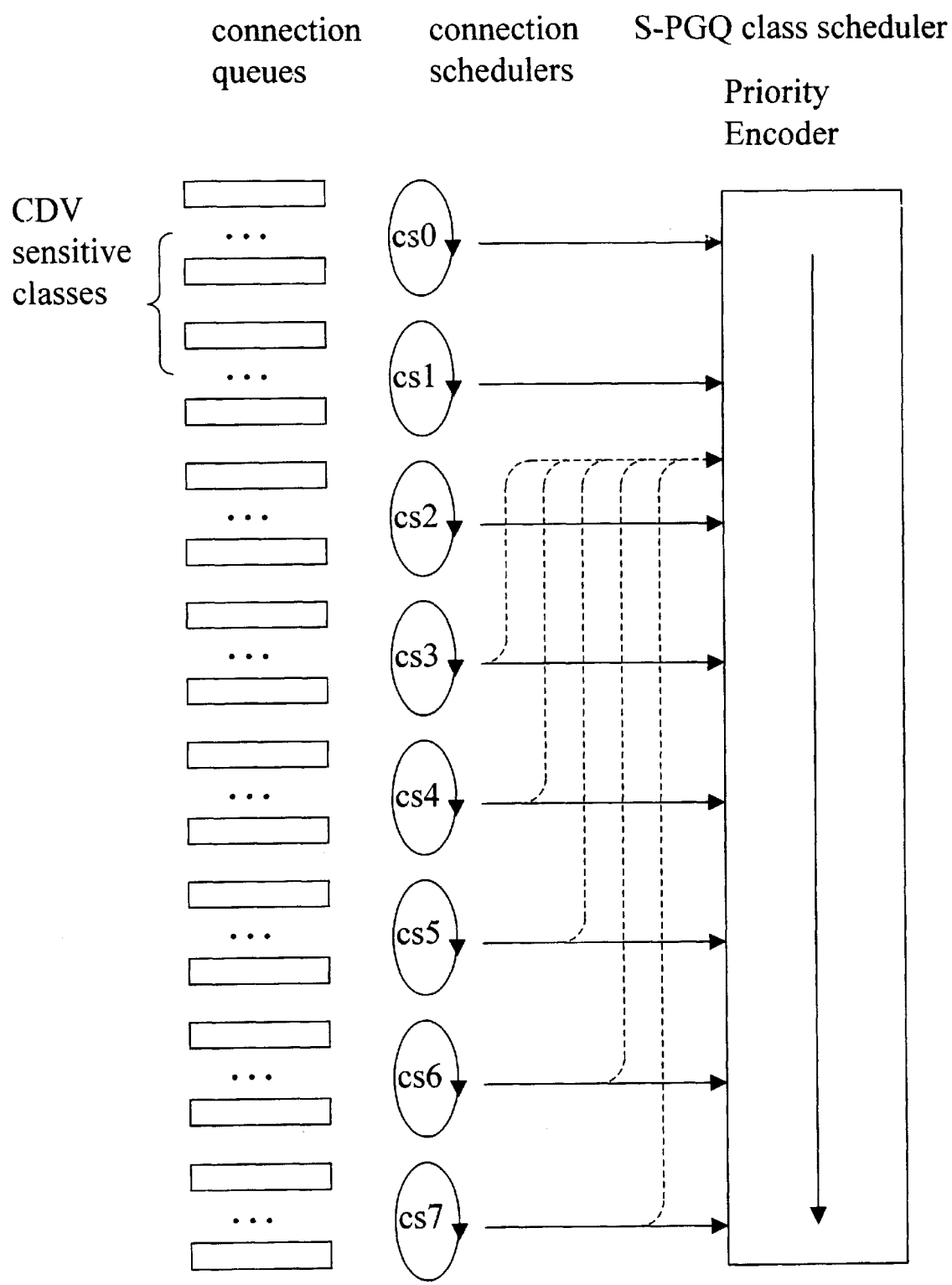
FIG. 1 is a schematic diagram depicting operation of a Statistical Priority Guarantee Queuing (SPGQ) scheduler constructed in accordance with the invention.
Figure 2:
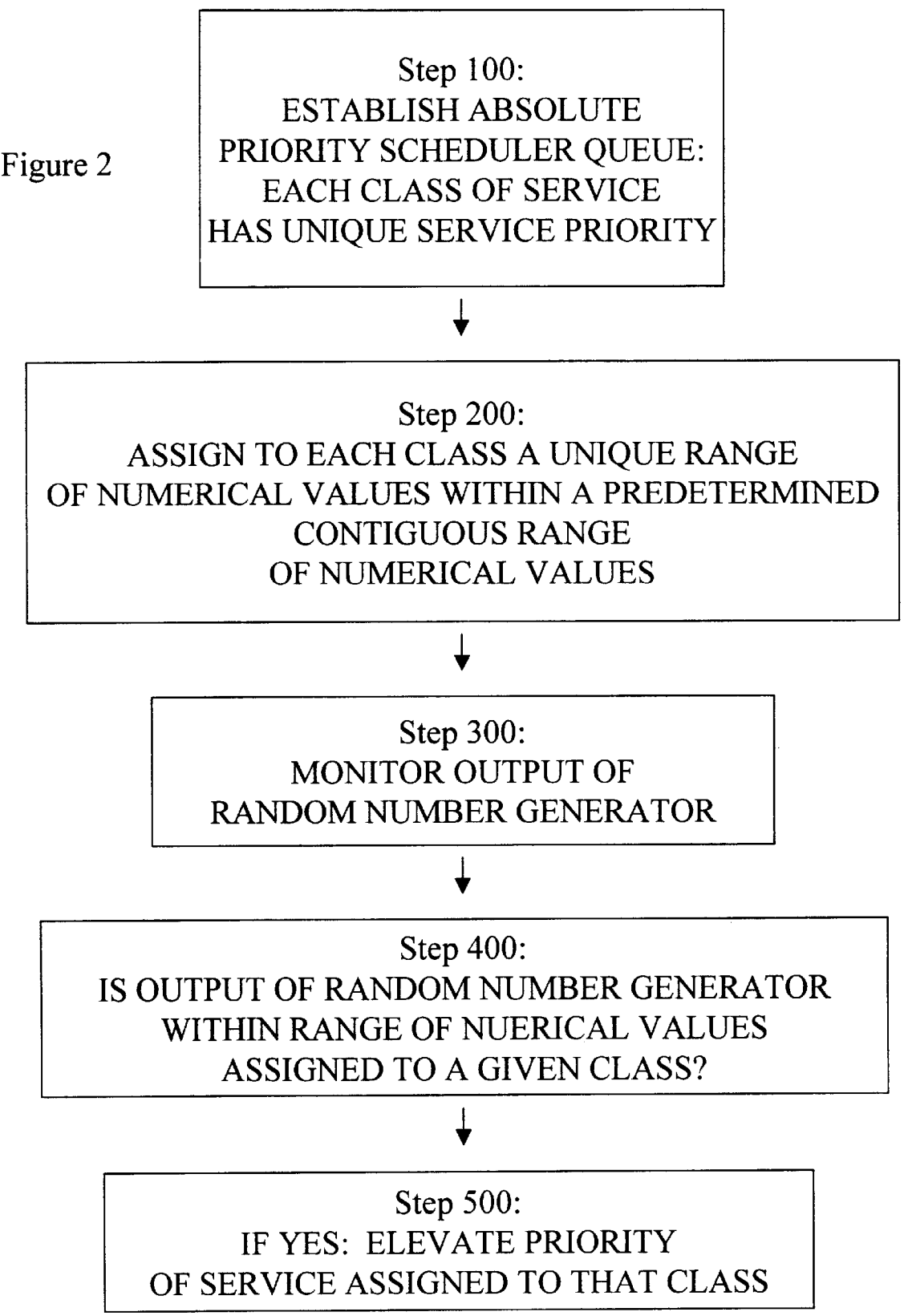
FIG. 2 is a flow chart depicting the general method steps executed by a Statistical Priority Guarantee Queuing (SPGQ) scheduler constructed in accordance with the invention.

The SPGQ aspect of the invention is illustrated schematically in the attached FIGS. 1 and 2. FIG. 1 shows an S-PGQ class scheduler that schedules 8 classes with a connection scheduler that schedules n queues within each class. In this practice of the invention, which utilizes an asynchronous transfer mode (ATM) queue manager, the SPGQ technique is applied to (and thus affects) only the six lowest priority connection schedulers (CS-2 to CS-7) which are intended for non-real-time classes. The two higher priority connection schedulers (CS-0 and CS-1) which are intended for real-time classes, are unaffected by the SPGQ processes. Furthermore, the lower six classes (CS-2 to CS-7) are not protected against misbehavior of real-time traffic in the upper 2 classes (but such behavior is far less likely to occur in these classes).

SPGQ, as applied in the ATM queue manager in this practice of the invention, statistically ensures that each of the non-real-time classes achieves a minimum specified fraction of the bandwidth available to the non-real-time classes.

SPGQ is based upon determining whether a random number lies within a sub-range proportional to the programmed statistical priority guarantee. For each individual statistical priority guarantee, values can be specified for 6 of the 8 connection schedulers (CS-2 to CS-7) of each link. Each of the lower 5 classes (CS-3 to CS-7) have an explicity programmed value of 5 bits, representing values ranging from $0/64$ to $31/64$ (0% to 48%). The fraction of bandwidth guaranteed to the highest non-real-time class (CS-2) is implicitly the remaining fraction not guaranteed to the lower 5 classes (CS-3 to CS-7).

For example, if the statistical priority guarantee for connection scheduler 3 (CS-3-SPG) is programmed to be $3/64$, then statistically, a 6-bit random number (which can have a value in the range of 0–63), will have the values 0, 1 or 2 three times out of six-four. Thus, the mechanism described herein will dynamically elevate the priority of CS-3 to ensure that CS-3 will be selected in $3/64$ of the cases when there are scheduled connections of higher static priority with eligible data. The SPGQ technique thus modifies the otherwise pure-priority behavior of the absolute priority scheduler.

The flowchart of FIG. 2 depicts the invention's SPGQ method of setting service priorities for each of a plurality of classes of service for digital traffic handled by an inter-class scheduler in a digital link system. The method comprises the first step (step 100) of establishing an absolute priority scheduler queue, wherein each class of service has a unique service priority. In addition, each class is assigned (step 200) a unique range of numerical values within a predetermined contiguous range of numerical values. The system then monitors (step 300) the output of a random number generator that generates numerical values. If (testing step 400) the output of the random number generator is within the range of numerical values assigned to a given class, the priority of service assigned to that class is temporarily elevated (step 500), and that class is provided a transmit opportunity. Steps 300, 400, 500 are repeated for each transmit opportunity.

The result of this technique is a scheduler in which the lower-priority classes are guaranteed a minimum bandwidth (which may be, for example, 10%, 5% or 2%) plus the possibility of receiving more bandwidth if the higher-priority classes above them do not require their entire share of bandwidth during a particular time interval.

Those skilled in the art will appreciate that the SPGQ technique is readily implemented in application-specific integrated circuits (ASICs) of a type and construction well-known in the field of digital link systems. The major components of the ASIC are illustrated in the block diagram of FIG. 3, and include a random number generator 10 and a random number generator output monitor 12, which communicates with the queuing module 14.

While the SPGQ techniques of the present invention have been described in connection with inter-class scheduling for an ATM link, they pertain equally to other inter-class scheduling applications, such as forwarding of digital data to a software-driven processor or other digital signal-handling devices and systems.

The SPGQ scheduler of the present invention provides a number of advantages over prior art schedulers. It provides statistical minimum bandwidth guarantees for all classes; allocation of the unused bandwidth to the active class of traffic having the highest priority; good stability under steady state and changing traffic patterns; and efficient use of switch resources through work-conserving service practice.

GCRA-PGQ

The SPGQ techniques described herein in accordance with one practice of the invention provide inexpensive, robust, high-performance priority guaranteed queuing, but higher accuracy can be attained through another practice of the present invention, utilizing a novel technique referred to herein as Generic Cell-Rate Algorithm Priority Guarantee Queuing (GCRA-PGQ).

This aspect of the invention involves applying the known technique of GCRA (discussed in detail above and also described in the references incorporated herein by reference) in a novel manner and at a new point in the digital link structure.

The GCRA-PGQ scheduler of the invention operates as a strict priority mechanism until a class begins using excessive bandwidth, by exceeding either the peak rate and/or the burst tolerance of a GCRA shape boundary for that class. When that occurs, that class is lowered in priority.

In particular, the GCRA-PGQ scheduler monitors outgoing traffic (cells being transmitted to the link) for each of a plurality of classes. If the scheduler detects that traffic for a given class exceeds predetermined GCRA-measured limits (such as, for example, excessively "bursty" traffic that exceeds the peak rate and/or burst tolerance of the GCRA), the scheduler reduces the priority accorded to that class, until the traffic for that class returns to a value within the GCRA-measured limits.

Figure 5:
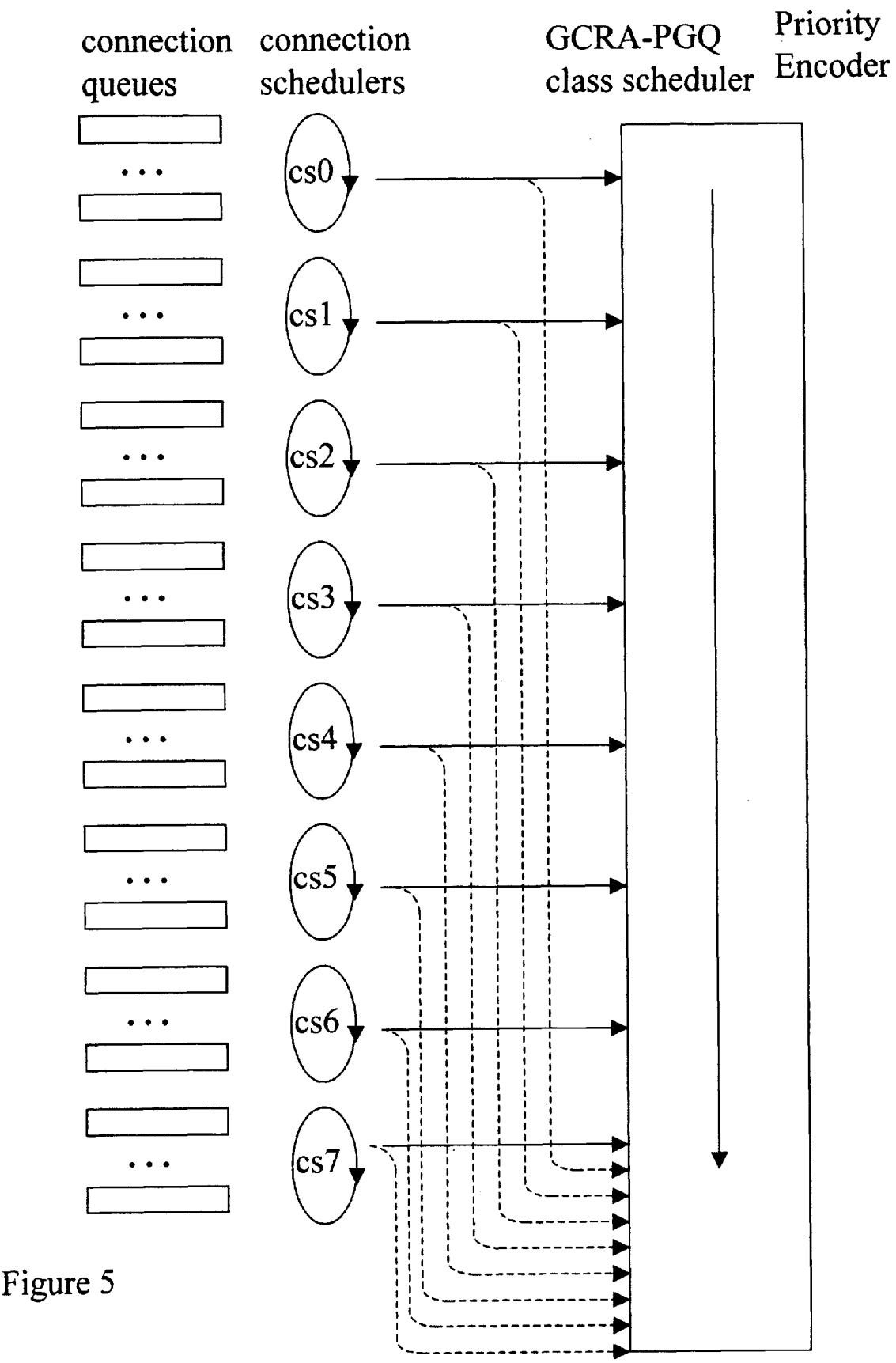
FIG. 5 is a schematic diagram depicting operation of a Generic Cell Rate Algorithm Priority Guarantee Queuing (GCRA-PGQ) scheduler constructed in accordance with the invention.

The GCRA-PGQ aspect of the invention is illustrated schematically in the attached FIGS. 4 and 5. FIG. 5 shows a GCRA-PGQ class scheduler that schedules eight classes with a connection scheduler that schedules n queues in each class. FIG. 5 shows that each of the classes may have its priority reduced. In the practice of this invention, the GCRA-PGQ technique is applied to all eight classes.

FIG. 4 is a flow chart depicting the general method steps executed by a Generic Cell-Rate Algorithm Priority Guarantee Queuing (GCRA-PGQ) scheduler constructed in accordance with the invention, for setting service priorities for each of a plurality of classes of service for digital traffic handled by an inter-class scheduler in a digital link system.

The method includes the step (step 1100) of establishing an absolute priority scheduler queue, wherein each class of service has a unique service priority. Each class is assigned (step 1200) a generic cell rate algorithm (GCRA) threshold based upon selected parameters of the digital traffic for that class. These parameters can include, but are not limited to, the known GCRA parameters described above.

The system then monitors (step 1300) these selected parameters of the digital traffic for each class for which a GCRA threshold has been assigned. If the selected parameters of the digital traffic in a class for which a GCRA threshold has been assigned exceed the GCRA threshold for that class (testing step 1400), the system lowers the priority of service assigned to that class.

As with the SPGQ scheduler, the GCRA-PGQ technique of the invention described herein is readily implemented in application-specific integrated circuits (ASICs) of a type and construction well-known in the field of digital link systems.

The GCRA-PGQ described herein out-performs SPGQ in minimizing cell delay variation (CDV) and can therefore be legitimately applied to all classes including real-time classes (CS–0–CS–1) such that all classes are guaranteed a minimum bandwidth and protected against the effect of excessive traffic in all classes including the real time classes. GCRA-PGQ operates as a strict priority mechanism until a class requires more than its minimum bandwidth. By contrast, in the case of SPGQ, the presence of data in a class affects every other class in a statistical manner, even under low congestion conditions. For this reason, the real-time classes should be and are excluded from the SPGQ algorithm.

The GCRA-PGQ scheduler of the present invention provides a number of advantages over prior art schedulers. It provides minimum bandwidth guarantees for all classes while not impacting CDV for well behaved high priority classes; exclusive allocation of the unused bandwidth to the active class of traffic having the highest priority; good stability under steady state traffic patterns; reasonably fast adaptation speed in response to changing traffic situations; and efficient use of switch resources through work-conserving service practice.

It will thus be seen that the invention efficiently attains the objects set forth above, among those made apparent from the preceding description. The SPGQ aspect of the invention provides an inexpensive, simple and efficient mechanism to provide priority guaranteed queuing, which avoids the burden of implementing a full priority guaranteed queuing scheduler. In particular, the GCRA-PGQ aspect of the invention minimizes cell delay variation for high priority classes. A class which does not exceed its minimum bandwidth guarantee is unaffected by the guarantee mechanism and will appear as though it was operating in an absolute priority environment. It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. In a digital link system having an inter-class scheduler, a method of setting service priorities for each of a plurality of classes of service for digital traffic handled by the scheduler, the method comprising the steps of:

establishing an absolute priority schedule wherein each class of service has a unique service priority, assigning to each class a unique range of numerical values within a predetermined contiguous range of numerical values, monitoring the output of a random number generator that generates numerical values, and,
      if the output of the random number generator is within the range of numerical values assigned to a given class, elevating the priority of service assigned to that class.

2. In a digital link system having an inter-class scheduler, a method of setting service priorities for each of a plurality of classes of service for digital traffic handled by the scheduler, the method comprising the steps of:

establishing a priority guarantee queue wherein at least one class of service has a unique service priority, assigning to said at least one class a generic cell rate algorithm threshold based upon selected parameters of the digital traffic scheduled for that class, monitoring the selected parameters of the digital traffic for each class for which a generic cell rate algorithm threshold has been assigned, and,
      if the selected parameters of the digital traffic in the at least one class for which a generic cell rate algorithm threshold has been assigned exceed the generic cell rate algorithm threshold for that class, lowering the priority of service assigned to that class.

3. The method of claim 2 wherein the priority of service assigned to a class having lowered priority remains lowered until the selected parameters of the digital traffic in the at least one class for which a generic cell rate algorithm threshold has been assigned drop below the generic cell rate algorithm threshold for that class.

* * * * *